United States Patent
Scott et al.

(10) Patent No.: US 7,764,283 B2
(45) Date of Patent: Jul. 27, 2010

(54) EYE MOVEMENT DATA REPLACEMENT IN MOTION CAPTURE

(75) Inventors: Remington Scott, Culver City, CA (US); Demian Gordon, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 803 days.

(21) Appl. No.: 11/614,872

(22) Filed: Dec. 21, 2006

(65) Prior Publication Data

US 2007/0146368 A1    Jun. 28, 2007

Related U.S. Application Data

(60) Provisional application No. 60/753,476, filed on Dec. 23, 2005.

(51) Int. Cl.
*G06T 15/00* (2006.01)
(52) U.S. Cl. ............... 345/419; 345/473; 345/629; 382/118
(58) Field of Classification Search ............ 345/473, 345/474, 475, 619, 620, 629, 630; 382/118
See application file for complete search history.

(56) References Cited

U.S. PATENT DOCUMENTS

| 6,044,168 | A  | * | 3/2000  | Tuceryan et al. ........ 382/118 |
| 6,163,322 | A  | * | 12/2000 | LaChapelle ............ 345/473 |
| 6,166,744 | A  | * | 12/2000 | Jaszlics et al. ......... 345/629 |
| 6,231,187 | B1 |   | 5/2001  | Munoz et al. |
| 6,351,269 | B1 | * | 2/2002  | Georgiev .............. 345/629 |
| 6,492,990 | B1 | * | 12/2002 | Peleg et al. ............ 345/473 |
| 6,944,320 | B2 | * | 9/2005  | Liu et al. .............. 382/118 |
| 7,129,949 | B2 | * | 10/2006 | Marschner et al. ....... 345/473 |
| 2004/0179013 | A1 |   | 9/2004  | Menache |
| 2005/0062743 | A1 |   | 3/2005  | Marschner et al. |
| 2005/0225723 | A1 |   | 10/2005 | Pilu |

* cited by examiner

*Primary Examiner*—Phu Nguyen
(74) *Attorney, Agent, or Firm*—Procopio, Cory, Hargreaves & Savitch LLP

(57) ABSTRACT

Replacing eye movement data in motion capture, comprising: capturing eye movement data from a first actor subsequent to a motion capture session where motion data for a second actor was captured, wherein the first actor performs to generate only the eye movement data with minimal movement of facial muscles that generate interfering signals; and representing the eye movement data captured from the first actor as eye movement data for the second actor in combination with motion data obtained during the motion capture session.

20 Claims, 9 Drawing Sheets

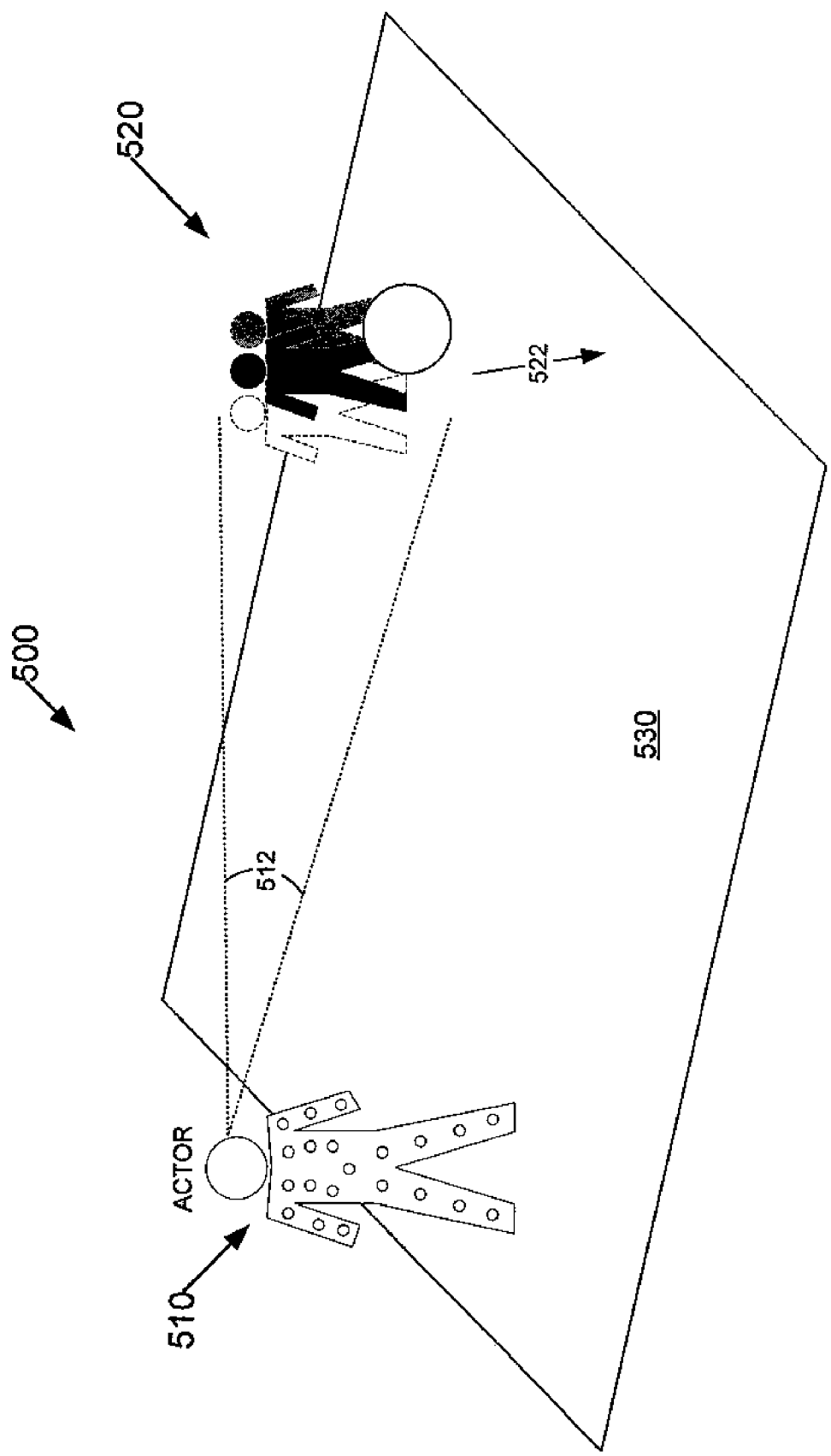

EYE MOVEMENT DATA REPLACEMENT IN MOTION CAPTURE

CROSS-REFERENCE TO RELATED APPLICATIONS

This application claims the benefit of priority of co-pending U.S. Provisional patent application Ser. No. 60/753,476 for "Eye Replacement in Motion Capture" which is filed Dec. 23, 2005. This application also related to U.S. patent application Ser. No. 10/984,488 for "System and Method for Tracking Facial Muscle and Bye Motion for Computer Graphics Animation" which is filed Nov. 8, 2004. The disclosures of the above-referenced patent applications are incorporated herein by reference.

BACKGROUND

The present invention relates to graphics and animation, and more particularly, to replacing eye movement data in graphics and animation using data developed through motion capture.

Motion capture systems are used to capture the movement of a real object and map it onto a computer-generated object. Such systems are often used in the production of motion pictures and video games for creating a digital representation of an object/person for use as source data to create a computer graphics animation.

A typical motion capture system includes multiple fixed motion capture cameras surrounding a volume of space and capturing motions of an actor who is wearing a suit with markers attached at various locations (e.g., having small reflective markers attached to the body and limbs). Cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital model, which may then be textured and rendered to produce a complete CG representation of the actor and/or performance. This technique has been used by special effects companies to produce realistic animations in many popular movies.

An advantage of motion capture systems over traditional animation techniques, such as keyframing, is the capability of real-time visualization. The production team can review the spatial representation of the actor's motion in real-time or near real-time, enabling the actor to alter the physical performance in order to capture optimal data. Moreover, motion capture systems detect subtle nuances of physical movement that cannot be easily reproduced using other animation techniques, thereby yielding data that more accurately reflects natural movement. As a result, animation created using source material that was collected using a motion capture system will exhibit a more lifelike appearance.

Notwithstanding these advantages of motion capture systems, a drawback of conventional motion capture systems is that capturing accurate eye motion is difficult since the markers cannot be attached to the actor's eyes.

SUMMARY

Implementations of the present invention provide for replacing eye movement data in motion capture.

In one implementation, a method of replacing eye movement data in motion capture comprises: capturing eye movement data from a first actor subsequent to a motion capture session where motion data for a second actor was captured, wherein the first actor performs to generate only the eye movement data with minimal movement of facial muscles that generate interfering signals; and representing the eye movement data captured from the first actor as eye movement data for the second actor in combination with motion data obtained during the motion capture session.

In another implementation, a method of replacing eye movement data in motion capture comprises: capturing eye movement data from an animator subsequent to a motion capture session, wherein the animator is performing to generate only the eye movement data with minimal movement of facial muscles that generate interfering signals; and replacing eye movement data captured during the motion capture session with the eye movement data captured from the animator.

In another implementation, a method of replacing eye movement data in motion capture comprises: optically capturing eye movement data from an animator subsequent to a motion capture session; and replacing eye movement data captured during the motion capture session with the eye movement data optically captured from the animator.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5A shows one example of a motion capture session;

DETAILED DESCRIPTION

Implementations of the present invention include replacing eye movement data in graphics and animation using data developed through motion capture.

After reading this description it will become apparent to one skilled in the art how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention as set forth in the appended claims.

Figure 1:
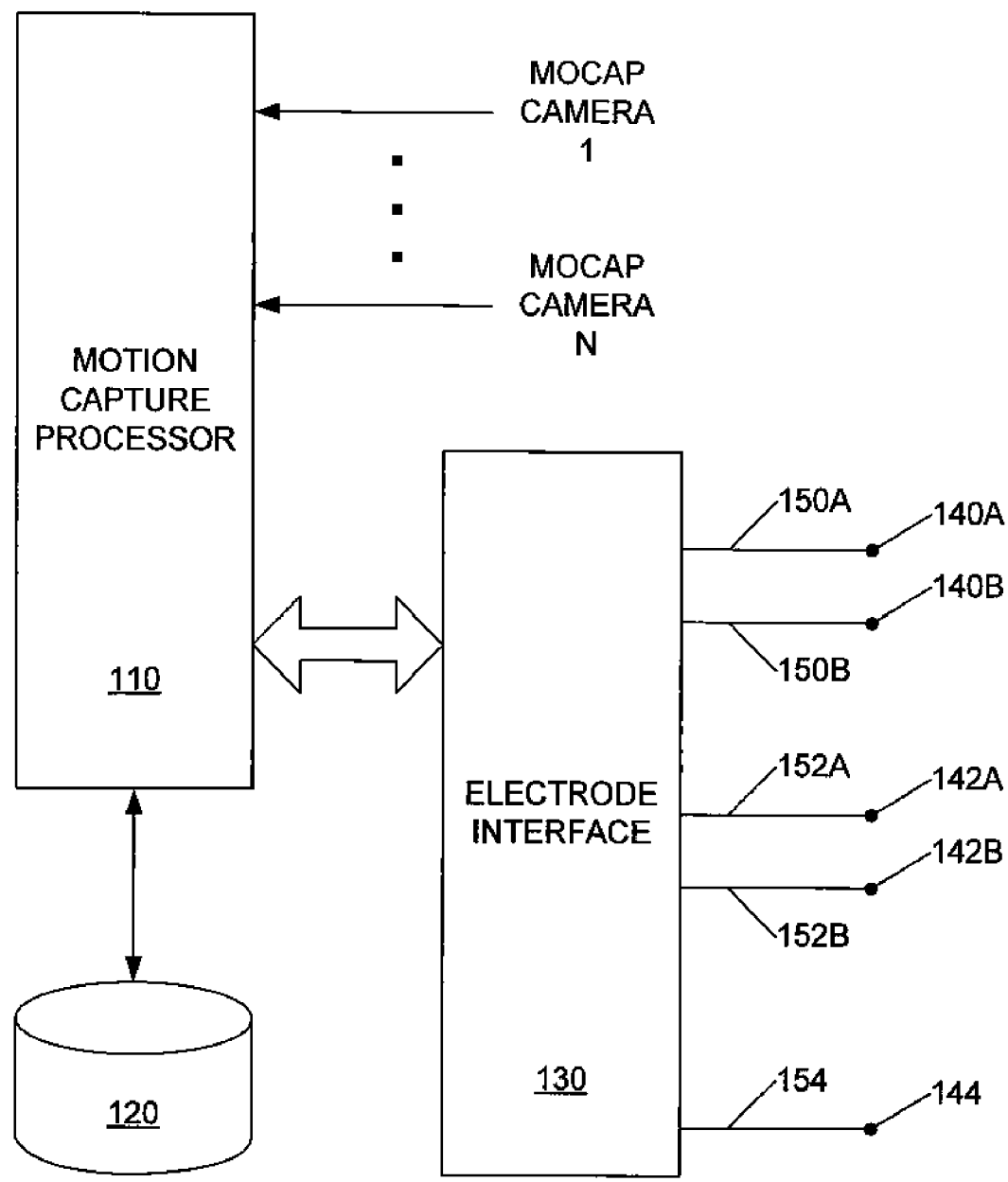
FIG. 1 is a block diagram illustrating a motion capture system.

FIG. 1 is a block diagram illustrating a motion capture system 100. The motion capture system 100 includes a motion capture processor 110 configured to process input data from N motion capture ("MOCAP") cameras. Input data include captured marker data from a plurality of body and facial markers. The motion capture processor 110 is also configured to communicate with a plurality of eye motion electrode pairs through a suitable electrode interface 130. The motion capture processor 110 may further comprise a programmable computer having a data storage device 120 configured to enable the storage of associated data files. As known in the art, one or more computer workstations may be coupled to the motion capture processor 110 using a network to enable multiple graphic artists to work with the stored data files in the process of creating a computer graphics animation. The motion capture processor 110 may further include a computer graphics animation system such as provided by a commercial software package that enables the creation of 3D graphics and animation for the entertainment industry. It should be understood that the computer graphics animation system may comprise an entirely separate computer hardware and software system from the motion capture processor 110, or alternatively, may be incorporated with the motion capture processor 110 (e.g., as a "plug-in") as part of a common hardware and software system.

The eye motion electrode pairs include electrodes 140A, 140B and 142A, 142B, which are coupled to the electrode interface 130 through respective electrical conductors 150A, 150B and 152A, 152B. Also, a ground electrode 144 is coupled to the electrode interface 130 through electrical conductor 154. In one implementation, eye motion is detected by acquiring and measuring electro-oculogram (EOG) from the eyes.

Figure 2:
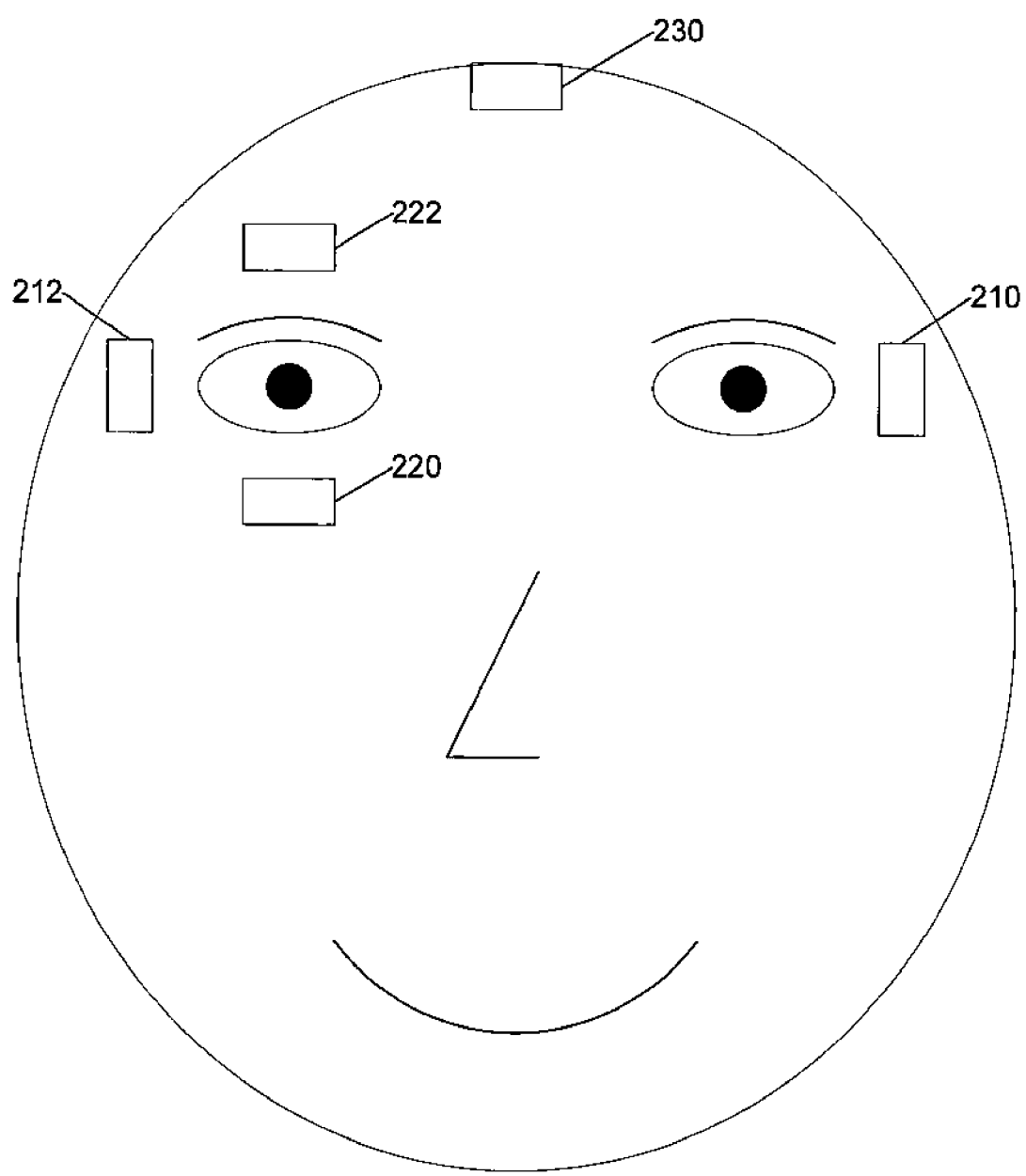
FIG. 2 shows designated locations for the EOG electrode pairs and the ground electrode with respect to the eye locations.

FIG. 2 shows designated locations for the EOG electrode pairs 140A, 140B, 142A, 142B and the ground electrode 144 with respect to the eye locations. Electrode pair locations 210 and 212 (suitable for electrode pair 140A, 140B) adjacent to the eyes are suitable to detect signals associated with left/right movement of the eyes. Electrode pair locations 220 and 222 (suitable for electrode pair 142A, 142B) below and above one of the eyes are suitable to detect signals associated with up/down movement of the eyes. A ground electrode location 230 (suitable for ground electrode 144) is positioned on the forehead. It is noted that the ground electrode 144 could be affixed anywhere on the body where it will not interfere with the application and action of the facial muscles, such as the neck, shoulder, elbow, etc. The forehead represents a convenient location for the ground electrode since it is close in proximity to the other electrodes without interference with facial muscle action. Since the dipoles representing the actor's two eyes will move in parallel, it is only necessary to collect up/down motion from one of the eyes. The EOG electrodes can be attached to the skin surface of the actor at the designated locations by conventional manner, such as using a cosmetic glue.

Figure 3:
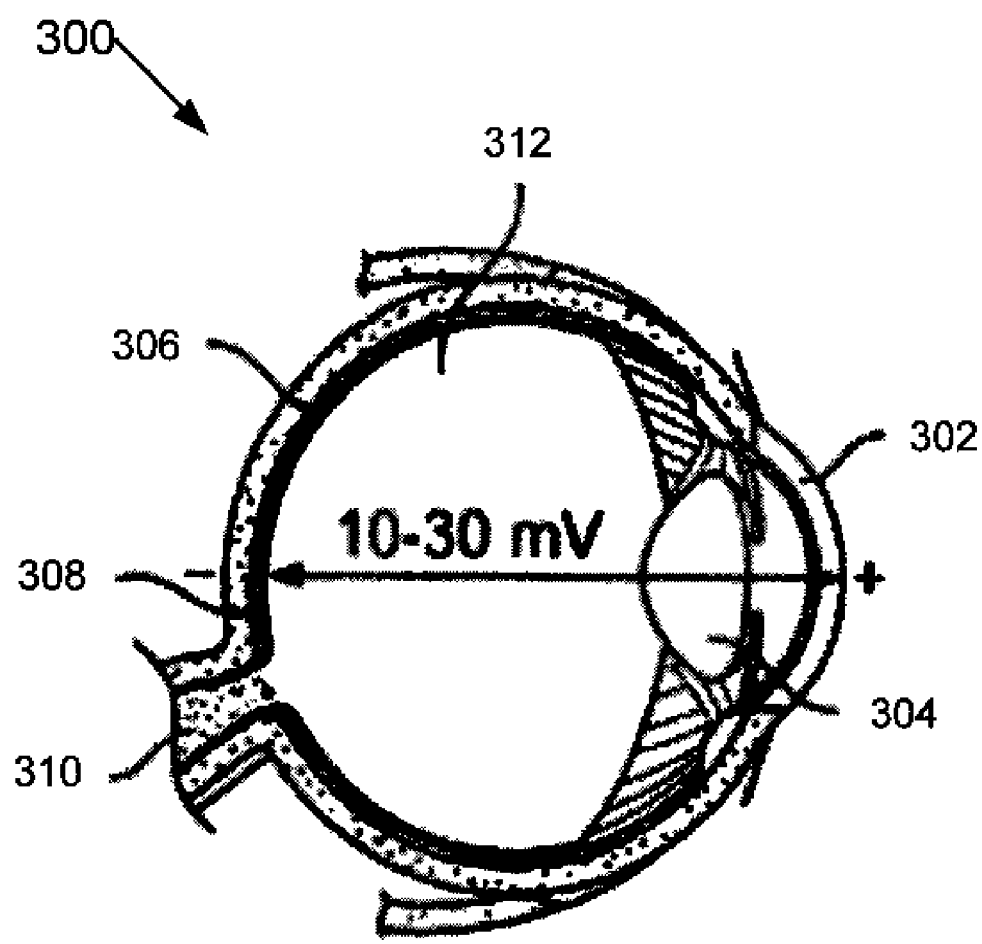
FIG. 3 is a side sectional view of a human eye.

FIG. 3 is a side sectional view of a human eye 300. The cornea 302 is located at the front surface of the eye, and provides a surface that transmits light rays reflected from an object. The light rays are bent, refracted and focused by the cornea 302, lens 304, and vitreous 312. The ocular fundus 308 provides the concave interior of the eye, which includes the retina 306. The lens 302 focuses an image of the object onto the retina 306, which converts the light rays into electrical impulses that are transmitted to the brain through the optic nerve 310. As understood in the art, a voltage potential exists between the cornea 302 and the ocular fundus 308. This voltage potential comprises a dipole that emits a measurable electric field such that the variations of the electric field are related to the movement of the eyes.

Figure 4A:
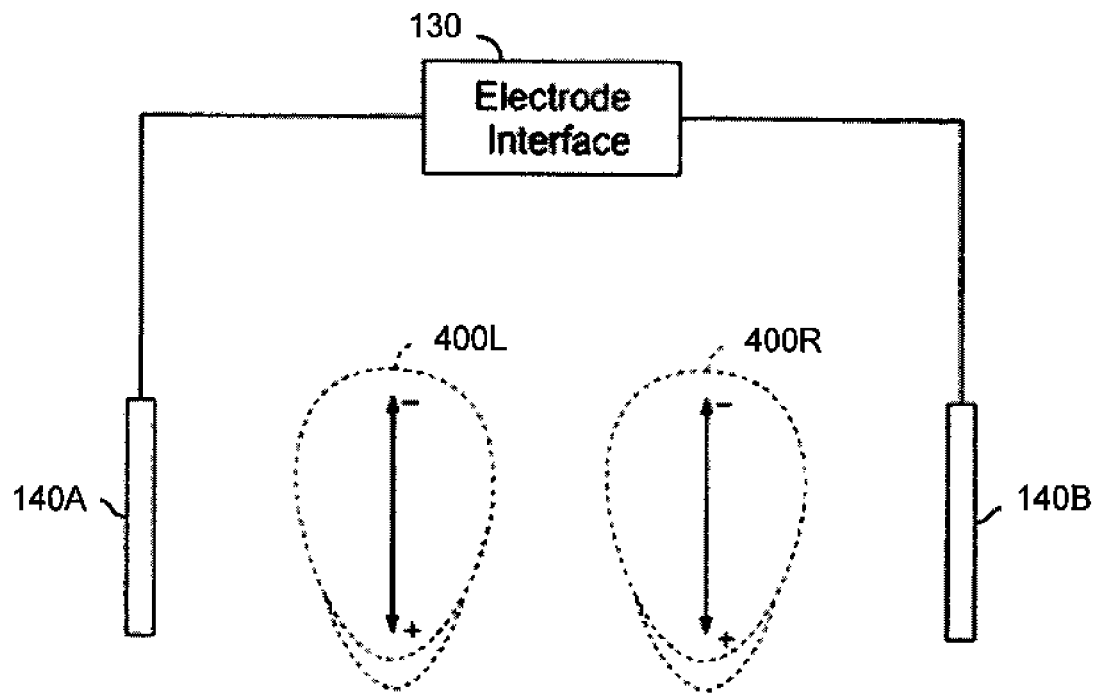
FIG. 4A shows the electric field measured between the electrodes as being null when the dipoles (i.e., eyes) are facing in a forward direction.
Figure 4B:
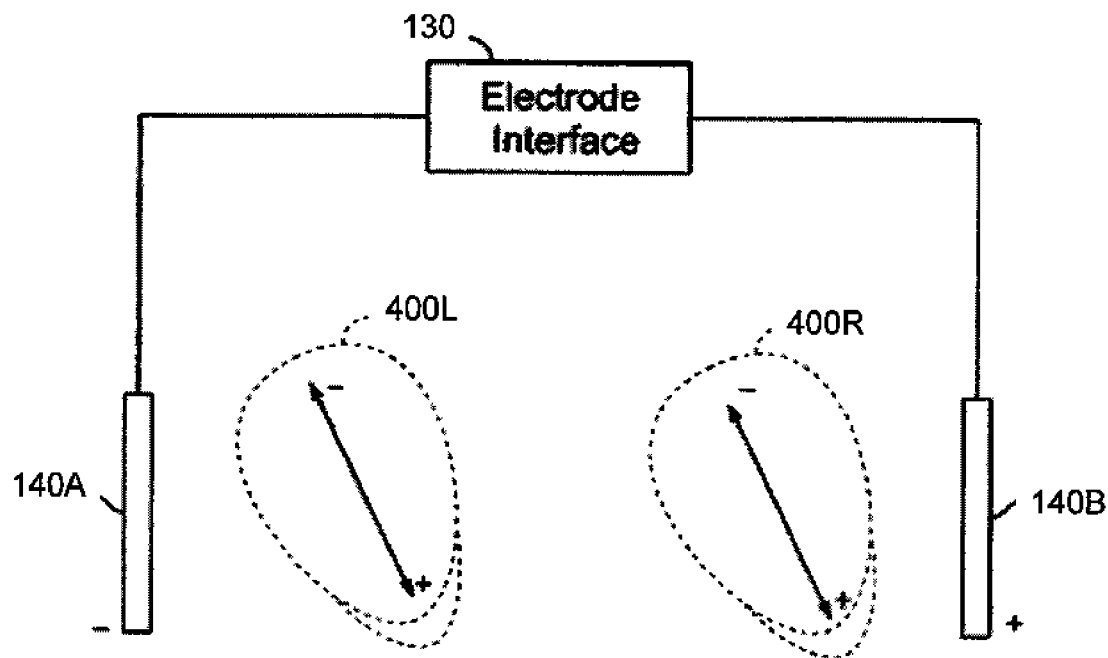
FIG. 4B shows the dipoles oriented to the right, thereby inducing a positive electric field between the electrodes.

FIGS. 4A and 4B illustrate two dipoles surrounded by an electrode pair 140A, 140B. The two dipoles correspond to each of an actor's eyes 400L, 400R. As shown in FIG. 4A, the electric field measured between the electrodes 140A, 140B is null when the dipoles (i.e., eyes) are facing in a forward direction. In FIG. 4B, the dipoles are oriented to the right, thereby inducing a positive electric field between the electrodes 140A, 140B. The electric field variation between the electrodes 140A, 140B, relative to ground provides suitable positional information for the eyes. This electrical field variation remains fairly linear with respect to eye movement for a range of roughly ±20 degrees from the nominal forward direction.

Returning now to FIG. 1, the motion capture processor 110 provides signal processing and amplification of the signals detected by the EOG electrodes. The processed signals are used to animate eyes in a digital model of the actor's head and face (see, e.g., U.S. patent application Ser. No. 10/984,488 for "System and method for tracking facial muscle and eye motion for computer graphics animation" filed Nov. 8, 2004). However, during a motion capture session, when an actor actively moves facial muscles, the signals from the muscle movement often interfere with the signals detected from the EOG electrodes. Therefore, to overcome this problem, the eye movement data captured during the capture session can be replaced in post processing with new eye movement data recorded from an animator in a process sometimes referred to as "eye dubbing" (similar to audio dubbing).

In one implementation, the eye movement data captured during the capture session can use the EOG technique described above, and the eye movement data would then be replaced with new eye movement data recorded from an animator in post processing. In another implementation, the motion capture processor ignores the eye movements of an actor during the capture session since eye movement data will be supplied by the data recorded from an animator in post processing.

During a motion capture session 500 (referred to as a beat), illustrated in FIG. 5A, an actor 510 wearing a suit with markers is performing within a capture volume 530 and has a group of capture objects (or other background objects) 520 in the field of view 512. In the illustrated implementation, the group of capture objects 520 is moving in a particular direction 522. In other implementations, capture objects in the group 520 may move in different directions from each other.

In one implementation, the group of capture objects 520 in the field of view 512 of the actor 510 includes other actors and objects in the same capture volume 530. Thus, in this implementation, one or more cameras around the capture volume 530 or on the actor 510 capture and record 'point of view' (POV) images (i.e., images seen by the actor's eyes). In another implementation, the group of capture objects 520 includes virtual capture objects captured or generated outside of the capture volume 530. Thus, in this implementation, POV images are captured/generated and recorded offline and the actor interfaces with and reacts to imaginary/virtual objects. The POV images can be generated on a computer system as computer graphics images.

Figure 5B:
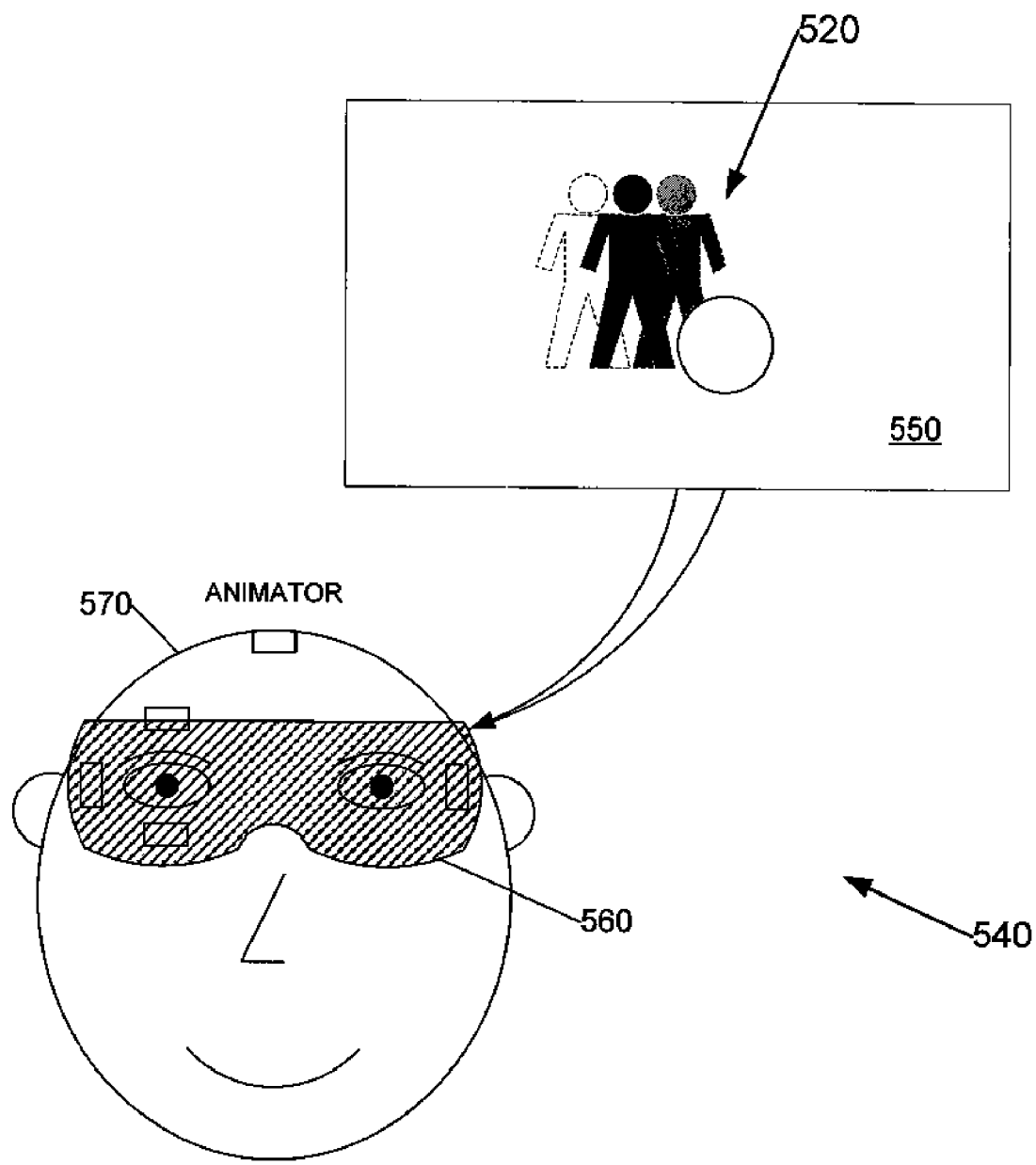
FIG. 5B shows one example of a post processing session.

Referring to FIG. 5B, after the motion capture session 500 is finished, a post processing session 540 is initiated. In the post processing session 540, the animator 570 performs to generate eye movement data for replacing the eye movement data captured from the actor 510 during the capture session 500. Since the animator 570, in the post processing session, is performing to generate only the eye movement data, the animator's facial muscle movements that generate interfering signals would be kept to a minimum.

The post processing session 540 includes the animator 570 putting on EOG electrodes in a similar configuration as shown in FIG. 2. The animator 570 then wears virtual reality goggles 560 that display recorded POV images 550. The displayed POV images 550 can be downloaded or streamed into the virtual reality goggles 560. Thus, the virtual reality goggles 560 allow the animator 570 to see what the actor 510 saw or would have virtually seen during the motion capture session 500. The post processor records the eye movement of the animator 570 who moves his or her eyes in reaction to the POV images 550 displayed on the virtual reality goggles 560. The recorded eye movement data captured from the animator 570 is then used to replace the eye movement data captured from the actor 510 (i.e., "eye dubbing").

Figure 6:
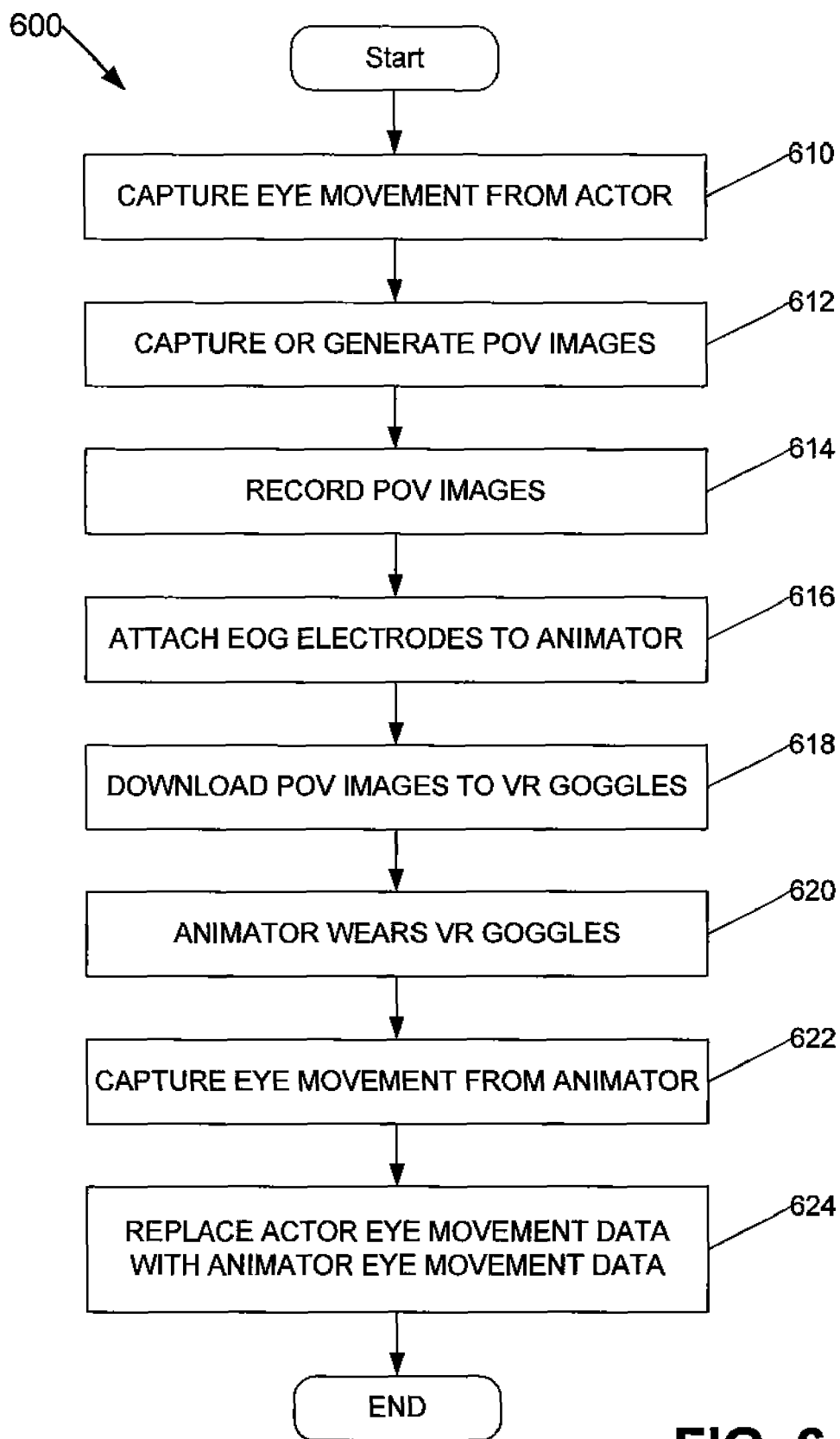
FIG. 6 is a flowchart illustrating a method of replacing eye movement data in motion capture.

FIG. 6 is a flowchart illustrating a method of replacing eye movement data in motion capture. During a motion capture session, movement of markers attached to an actor is captured by a plurality of motion capture cameras. Furthermore, the actor actively moves facial muscles to generate facial movement data. As described above, eye movements of the actor are also captured, at 610, using EOG electrodes. Further, POV images are captured or generated, at 612, and recorded, at 614. Then, after the motion capture session is finished, an animator performs to generate eye movement data for replacing the eye movement data captured from the actor. Thus, at 616, EOG electrodes are attached to the animator. At 618, the POV images are downloaded or streamed to virtual reality (VR) goggles. The animator wears the VR goggles, at 620, and the eye movements of the animator are captured, at 622. The actor eye movement data is replaced, at 624, with the animator eye movement data.

Figure 7A:
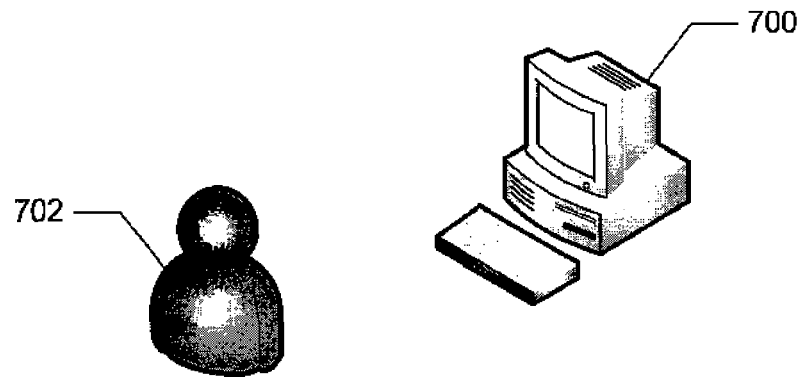
FIG. 7A shows a representation of a computer system and a user.

FIG. 7A shows a representation of a computer system 700 and a user 702. The user 702 can use the computer system 700 to process motion capture data. The computer system 700 stores and executes an eye movement data replacement unit 712, which synchronizes and processes motion capture data.

Figure 7B:
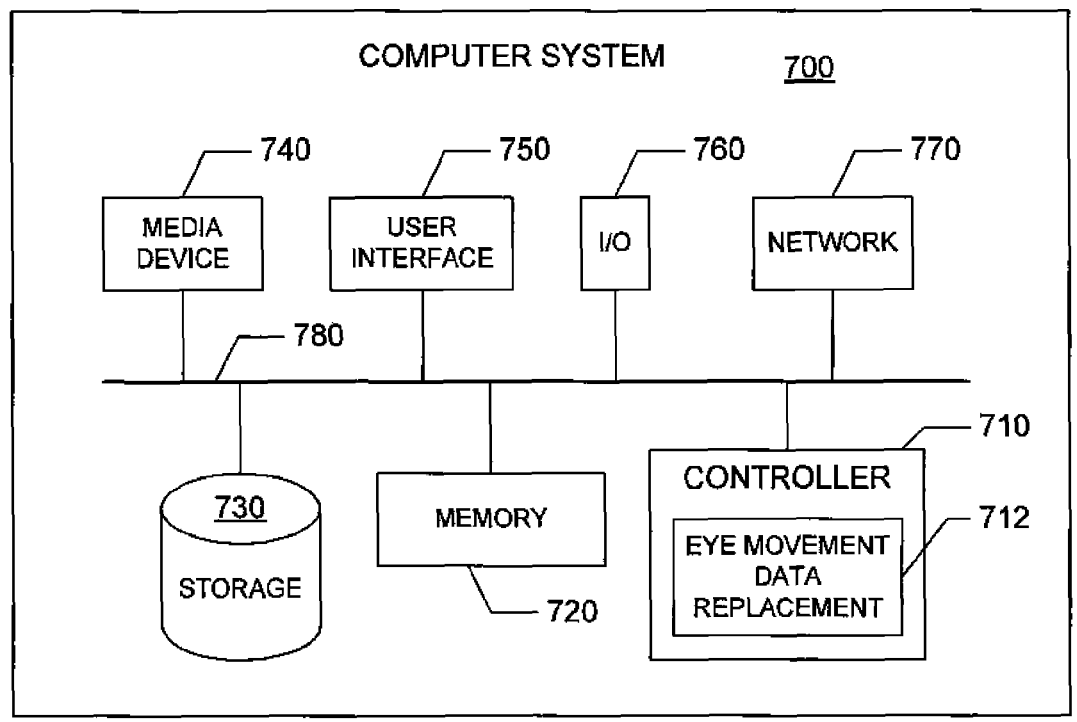
FIG. 7B shows a block diagram of one implementation of the computer system in FIG. 7A, including the eye movement data replacement unit.

FIG. 7B shows a block diagram of one implementation of the computer system 700 in FIG. 7A, including the eye movement data replacement unit 712. The computer system 700 includes a controller 710, a memory 720, storage 730, a media device 740, a user interface 750, an input/output (I/O) interface 760, and a network interface 770. These components are interconnected by a common bus 780. Alternatively, different connection configurations can be used, such as a star pattern with the controller at the center.

The controller 710 is a programmable processor and controls the operation of the computer system 700 and its components. The controller 710 loads instructions from the memory 720 or an embedded controller memory (not shown) and executes these instructions to control the system. In its execution, the controller 710 provides the eye movement data replacement unit 712 as a software system. Alternatively, this service can be implemented as separate components in the controller 710 or the computer system 700.

Memory 720 stores data temporarily for use by the other components of the computer system 700. In one implementation, memory 720 is implemented as RAM. In one implementation, memory 720 also includes long-term or permanent memory, such as flash memory and/or ROM.

Storage 730 stores data temporarily or long term for use by other components of the computer system 700, such as for storing data used by the eye movement data replacement unit 712. In one implementation, storage 730 is a hard disk drive.

The media device 740 receives removable media and reads and/or writes data to the inserted media. In one implementation, the media device 740 is an optical disc drive.

The user interface 750 includes components for accepting user input from the user of the computer system 700 and presenting information to the user. In one implementation, the user interface 750 includes a keyboard, a mouse, audio speakers, and a display. The controller 710 uses input from the user to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).

Figure 8:
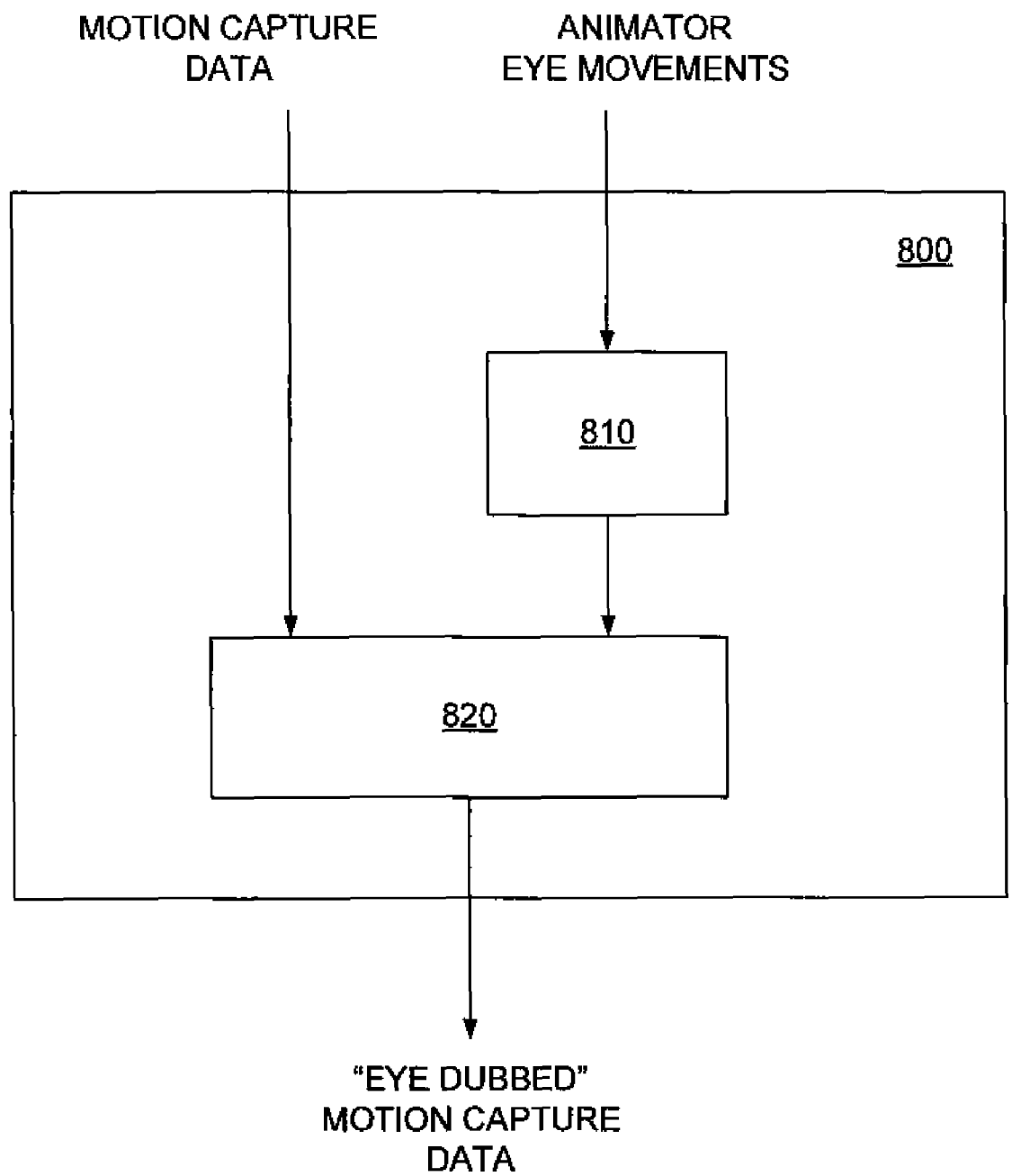
FIG. 8 is a block diagram illustrating an eye movement data replacement unit.

FIG. 8 is a block diagram illustrating an eye movement data replacement unit 800. In the illustrated implementation, the eye movement data replacement unit 800 includes an animator eye movement capturing unit 810 which captures eye movement data from an animator subsequent to a motion capture session. The unit 800 also includes a replacement unit 820 which receives the motion capture data captured during the capture session and replaces the eye movement data from an actor with the eye movement data of the animator received from the animator eye movement capturing unit 810. The resultant output from the replacement unit 820 is the "eye dubbed" motion capture data.

Various illustrative implementations of the present invention have been described. However, one of ordinary skill in the art will recognize that additional implementations are also possible and within the scope of the present invention. For example, different techniques (other than using EOG electrodes) could be used to capture the animator's eye movements in response to the virtual environment. In one example, one or more digital cameras are embedded in the VR goggles to optically capture the eye movements of the animator in response to the displayed POV images. In another example, one or more digital cameras are positioned in front of the animator's eyes to optically capture the eye movements of the animator through the transparent VR goggles Further, although the implementations describe an actor as performing during a motion capture session and an animator as performing during a post processing session, the two terms are interchangeable as a first actor and a second actor or both sessions can be performed by a single actor.

Accordingly, the present invention is not limited to only those implementations described above.

What is claimed is:

1. A computer-readable medium storing a computer-implemented method of replacing eye movement data in motion capture, comprising:
   capturing eye movement data from a first actor subsequent to a motion capture session where motion data for a second actor was captured,
   wherein the first actor performs to generate only the eye movement data with minimal movement of facial muscles that generate interfering signals; and
   representing the eye movement data captured from the first actor as eye movement data for the second actor in combination with motion data obtained during the motion capture session.

2. The computer-readable medium of claim 1, further comprising
   capturing eye movement data from the second actor during the motion capture session.

3. The computer-readable medium of claim 2, wherein said capturing eye movement data from the second actor includes
   using EOG electrodes to measure signals indicating eye movements of the second actor.

4. The computer-readable medium of claim 1, further comprising
   capturing and recording the second actor's point of view (POV) images.

5. The computer-readable medium of claim 1, further comprising
   generating and recording the second actor's point of view (POV) images.

6. The computer-readable medium of claim 1, wherein said capturing eye movement data from a first actor includes:
   attaching EOG electrodes to the first actor;
   downloading the second actor's POV images to VR goggles; and
   measuring eye movements of the first actor using signals from the EOG electrodes.

7. The computer-readable medium of claim 6, further comprising
   capturing eye movement data from the second actor during the motion capture session,
   wherein the second actor actively moves facial muscles to generate facial movement data.

8. The computer-readable medium of claim 7, wherein said representing the eye movement data captured from the first actor includes
   replacing the eye movement data captured from the second actor with the eye movement data captured from the first actor.

9. A computer-readable medium storing a computer-implemented method of replacing eye movement data in motion capture, the computer-implemented method comprising:
   capturing eye movement data from an animator subsequent to a motion capture session,
   wherein the animator is performing to generate only the eye movement data with minimal movement of facial muscles that generate interfering signals; and
   replacing eye movement data captured during the motion capture session with the eye movement data captured from the animator.

10. A computer-readable medium storing a computer-implemented method of replacing eye movement data in motion capture, the method comprising:
    optically capturing eye movement data from an animator subsequent to a motion capture session; and
    replacing eye movement data captured during the motion capture session with the eye movement data optically captured from the animator.

11. A computer-readable storage medium storing a computer program for replacing eye movement data in motion capture, the compute program comprising executable instructions that cause a computer to:
    capture eye movement data from a first actor subsequent to a motion capture session wherein motion data for a second actor was captured,
    wherein the first actor performs to generate only the eye movement data with minimal movement of facial muscles that generate interfering signals.

12. The computer-readable storage medium of claim 11, further comprising executable instructions that cause a computer to
    represent the eye movement data captured from the first actor as eye movement data for the second actor in combination with motion data obtained during the motion capture session.

13. The computer-readable storage medium of claim 11, further comprising executable instructions that cause a computer to
    capture eye movement data from the second actor during the motion capture session.

14. The computer-readable storage medium of claim 13, wherein executable instructions that cause a computer to capture eye movement data from the second actor includes executable instructions that cause a computer to
    measure EOG electrode signals indicating eye movements of the second actor.

15. The computer-readable storage medium of claim 11, further comprising executable instructions that cause a computer to
    capture and record the second actor's point of view (POV) images.

16. The computer-readable storage medium of claim 11, further comprising executable instructions that cause a computer to
    generate and record the second actor's point of view (POV) images.

17. The computer-readable storage medium of claim 11, wherein executable instructions that cause a computer to capture eye movement data from the first actor includes executable instructions that cause a computer to:
    download the second actor's POV images to VR goggles; and
    measure eye movements of the first actor using signals from EOG electrodes attached to the first actor.

18. The computer-readable storage medium of claim 17, further comprising executable instructions that cause a computer to
    capture eye movement data from the second actor during the motion capture session,
    wherein the second actor actively moves facial muscles to generate facial movement data.

19. The computer-readable storage medium of claim 18, wherein executable instructions that cause a computer to represent the eye movement data captured from the first actor includes executable instructions that cause a computer to
    replace the eye movement data captured from the second actor with the eye movement data captured from the first actor.

20. An apparatus for replacing eye movement data in motion capture, comprising:

means for capturing eye movement data from a first actor subsequent to a motion capture session where motion data for a second actor was captured,
wherein the first actor is performing to generate only the eye movement data with minimal movement of facial muscles that generate interfering signals; and means for replacing eye movement data captured from the second actor during the motion capture session with the eye movement data captured from the first actor.

* * * * *